G. C. BERRYMAN.
INNER TUBE FOR AUTOMOBILE TIRES.
APPLICATION FILED MAY 15, 1917.

1,279,228.

Patented Sept. 17, 1918.

Inventor
Grover C. Berryman
by Hazard and Miller
Att'ys.

United States Patent Office.

GROVER C. BERRYMAN, OF LOS ANGELES, CALIFORNIA, ASSIGNOR OF FORTY-FIVE ONE-HUNDREDTHS TO CHARLES A. JONES, OF LOS ANGELES, CALIFORNIA.

INNER TUBE FOR AUTOMOBILE-TIRES.

1,279,228.

Specification of Letters Patent. Patented Sept. 17, 1918.

Application filed May 15, 1917. Serial No. 168,736.

*To all whom it may concern:*

Be it known that I, GROVER C. BERRYMAN, a citizen of the United States, residing at Los Angeles, in the county of Los Angeles and State of California, have invented new and useful Improvements in Inner Tubes for Automobile-Tires, of which the following is a specification.

This invention relates to a pneumatic tire and particularly pertains to an inner tube therefor.

In most pneumatic tire constructions, it is common practice to use a heavy outer casing within which a light inner tube is positioned. This tube is formed with a thin rubber wall, within which air is confined, and which may be easily punctured. It is the principal object of this invention to provide an inner tube adapted to be used with tire casings of common construction and which is so designed as to reinforce the walls of the tube and insure against their becoming punctured or otherwise weakened.

Another object of this invention is to provide an inner tube which is formed with an outer reinforcing wall of a resilient material and which will add resiliency to the casing of the tire independent of the pneumatic cushion.

Another object of this invention is to provide an inner tube which requires a small volume of air to inflate its cushion opening and which is so constructed as to insure against leakage around the valve of the tire.

It is a further object of this invention to provide a pneumatic inner tube which is reinforced by means of a fabric lining and is therefore rendered more durable than the ordinary inner tube, and is further constucted with an outer facing which will prevent creeping of the tube within the casing.

Other objects will appear hereinafter.

The invention is illustrated, by way of example, in the accompanying drawings in which.

Figure 1:
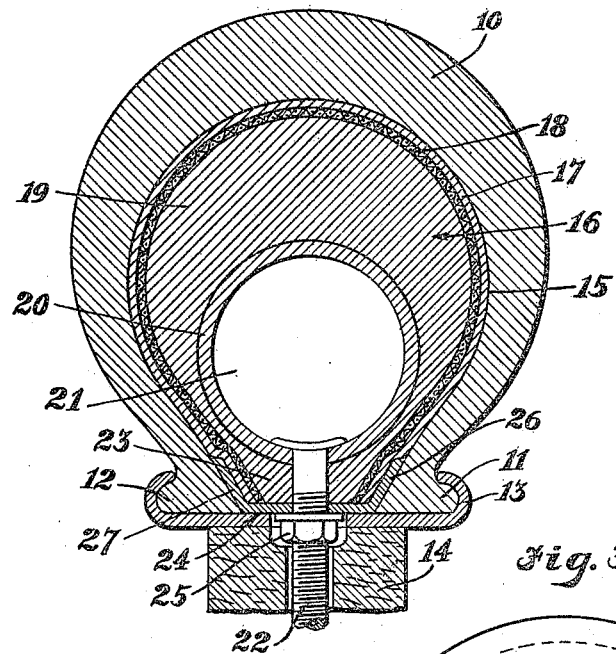
Figure 1 is a view in transverse section as seen through a pneumatic tire, the casing of which is fitted with the inner tube with which the present invention is concerned.
Figure 2:
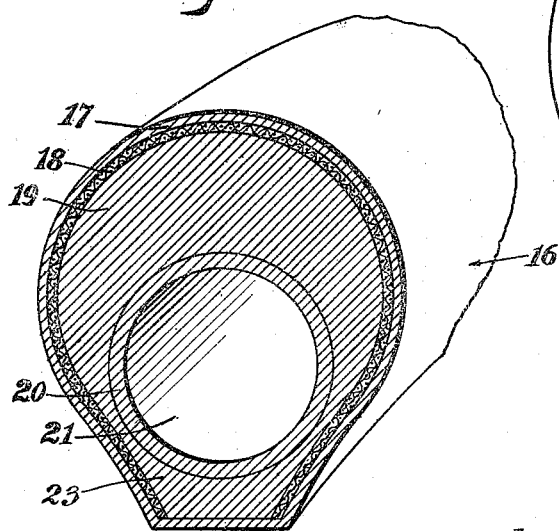
Fig. 2 is a view in transverse section and perspective illustrating the inner tube in detail.
Figure 3:
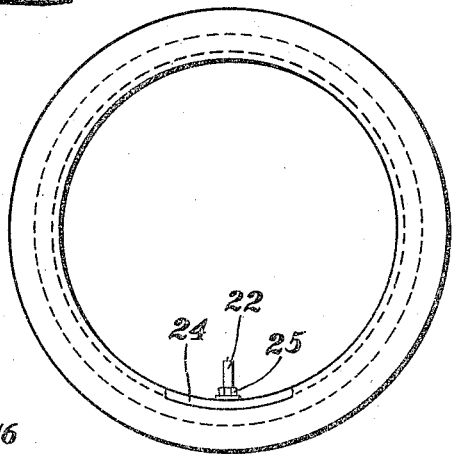
Fig. 3 is a view in plan showing the entire inner tube and the reinforcing member which is disposed around the valve thereof.

Referring more particularly to the drawings, 10 indicates the outer casing of a pneumatic tire. The casing as here shown, is of common construction and is of the clencher type, having fastening beads 11 and 12 extending outwardly from its inner side. These beads are mounted within a clencher rim 13 which is positioned upon a wheel felly 14 of ordinary design. The space 15 within the tire casing is filled by means of an inner tube 16. This tube is preferably constructed as indicated in my co-pending application entitled Method of making tubes for automobile tires, Serial No. 117,304, allowed April 25, 1917.

The tube is annular and when formed continuously fills the space within the casing, as is common with ordinary inner tubes. The main body of the tube, however, is substantially pear-shaped in transverse section, having an outer rubber facing 17 which incloses a fabric lining 18. The lining 18 is mounted over a reinforcing rubber body 19 which entirely incloses an inner rubber lining 20. The lining 20 forms an annular air chamber 21 of circular cross-section. This chamber is not disposed concentrically of the inner tube but is positioned adjacent the inner edge thereof and along the reduced section of the structure, as particularly shown in the drawings. The wall 20 which forms a lining for the compartment 21 is formed of rubber which is vulcanized within a circular opening formed throughout the circumference of the reinforcing body 19. This body is preferably formed of high-grade rubber and possesses considerable inherent resiliency which aids the pneumatic chamber 21 in supporting the tire casing 10 and thereby eliminates the necessity of having a large air cushion for the casing. The fabric covering 18 which is positioned over the body 19 is vulcanized in place, and attention is directed to the fact that this covering does not entirely surround the tire, as considered in section, but extends from the inner circumferential face, around the side, over the top, and down the opposite side, to the inner face. This permits the inner tube to expand without being confined upon all its sides by a non-yielding fabric or textile covering. The outer lining with which the textile covering is fitted is preferably formed of rubber, which will bear against the inner face of the tire casing and prevent creeping of the tire.

Due to the fact that the air valves of pneumatic tubes often tear out, the present construction as here shown permits a valve 22 to be firmly mounted within the inner tube and to extend through a thick inner wall 23 which is not present in inner tubes of ordinary construction. This valve stem is further held rigid by means of a reinforcing plate 24, preferably made of brass and vulcanized to the inner tube and through which the stem projects and against which a locknut 25 is brought to bear. The plate 24 extends circumferentially a short distance each side of the valve stem and also is provided with side flanges 26 and 27 which extend upwardly along the opposite side faces of the inner tube to more firmly anchor the valve in its intended position.

In the application of this inner tube for use, it is positioned within the outer casing 10 in the customary manner and the casing is then mounted upon a suitable clencher rim, as indicated in the drawings by the numeral 13. When the casing is in position, the air compartment 21 within the tire may be inflated through the valve stem 22. When this compartment has been filled with air to a desired pressure, the tire is ready for use. Upon the road sudden shocks will be directly absorbed within the tire casing and also the body 19 of the inner tube.

This body will at all times be pneumatically supported upon a cushion formed by the air passage-way 21. Under extreme shock, the inner tube will be depressed so that the load will be directly carried by the air cushion within the inner tube. When the outer casing is punctured, it will be observed that the fabric 18 will tend to turn the articles which have penetrated the casing, and if they should be driven into the body portion 19 will have small possibility of reaching the air compartment.

Thus I have produced an inner tube non-expansible in cross-section except at the rim seat.

It will thus be seen that the inner tube here provided combines the use of an air cushion and a resilient support for the casing of a pneumatic tire, and that it also protects the air chamber within the tube so that it is not liable to be punctured or otherwise damaged.

While I have shown the preferred construction of my inner tube for pneumatic tires as now known to me, it will be understood that various changes in the combination, construction, and arrangement of parts may be made by those skilled in the art without departing from the spirit of my invention.

I claim:

1. An inner tube for pneumatic tires comprising an annular air tube having a thin rubber wall circular in cross-section, a resilient body formed around said wall substantially circular in section and disposed eccentrically of the tube; said body having a reduced neck portion extending inwardly and across the inner annular periphery of which a flat face is formed; a thin fabric covering disposed around the body portion and terminating at the opposite edges of the flat part of the body portion, an outer rubber wall secured over the fabric covering and entirely around the body portion, a valve stem extending from the air tube, and a shield plate through which the valve stem extends; said plate conforming to the annular flat portion of the body and having opposite flanges extending upwardly along opposite sides of the body.

2. An inner tube for pneumatic tires comprising an annular air tube having a thin rubber wall circular in cross-section, a resilient body formed around said wall substantially circular in section and disposed eccentrically of the tube; said body having a reduced neck portion extending inwardly and across the inner annular periphery of which a flat face is formed; a thin fabric covering disposed around the body portion and terminating at the opposite edges of the flat part of the body portion, and an outer rubber wall secured over the fabric covering and entirely around the body portion.

3. An inner tube having an annular flat rim seat; said tube being non-expansible diametrically and transversely from one side of the rim seat around the tube to the other side of the rim seat and said rim seat being expansible.

In testimony whereof I have signed my name to this specification.

GROVER C. BERRYMAN.